(12) United States Patent
Lin (10) Patent No.: US 6,892,323 B2
(45) Date of Patent: May 10, 2005

(54) DUAL BASIC INPUT/OUTPUT SYSTEM FOR A COMPUTER

(75) Inventor: Hou-Yuan Lin, Taipei (TW)

(73) Assignee: Giga-Byte Technology Co., Ltd., Hsin-Tien (TW)

( * ) Notice: Subject to any disclaimer, the term of this patent is extended or adjusted under 35 U.S.C. 154(b) by 493 days.

(21) Appl. No.: 10/097,066

(22) Filed: Mar. 12, 2002

(65) Prior Publication Data

US 2002/0099974 A1 Jul. 25, 2002

Related U.S. Application Data

(63) Continuation-in-part of application No. 09/305,668, filed on May 5, 1999.

(51) Int. Cl.$^7$ ................................................ G06F 11/00
(52) U.S. Cl. ................................ 714/36; 714/13; 713/2
(58) Field of Search .......................... 714/13, 36; 713/2

(56) References Cited

U.S. PATENT DOCUMENTS

| | | | | |
|---|---|---|---|---|
| 5,327,531 A | * | 7/1994 | Bealkowski et al. ............ | 714/6 |
| 5,432,927 A | * | 7/1995 | Grote et al. ..................... | 713/2 |
| 5,793,943 A | * | 8/1998 | Noll ................................ | 714/6 |
| 5,978,939 A | * | 11/1999 | Mizoguchi et al. ............ | 714/55 |
| 6,122,733 A | * | 9/2000 | Christeson et al. ............ | 713/2 |
| 6,167,532 A | * | 12/2000 | Wisecup ........................ | 714/23 |
| 6,401,221 B1 | * | 6/2002 | Sun et al. ...................... | 714/36 |
| 6,421,792 B1 | * | 7/2002 | Cromer et al. ................ | 714/36 |
| 6,651,188 B2 | * | 11/2003 | Harding et al. ............... | 714/38 |

* cited by examiner

Primary Examiner—Robert Beausoliel
Assistant Examiner—Gabriel L. Chu
(74) Attorney, Agent, or Firm—Winston Hsu (57) ABSTRACT

A computer system has a central processing unit (CPU), and a chipset for supporting the CPU, and a selectable BIOS system. The chipset has a first general purpose input/output (GPIO) register. The selectable BIOS includes a primary and secondary BIOS programs, a timer circuit for generating a delay signal after power-on of the computer system, and a BIOS switching circuit. The primary BIOS program has confirmation code for generating a confirmation signal on the first GPIO register. The BIOS switching circuit shadows the primary or secondary BIOS program into a predetermined address space of the CPU according to the confirmation signal and the delay signal. While the primary BIOS program is shadowed, if the BIOS switching circuit receives the timer delay signal before receiving the BIOS confirmation signal, then the BIOS switching circuit causes the CPU to be reset and shadows the secondary BIOS program.

8 Claims, 5 Drawing Sheets

DUAL BASIC INPUT/OUTPUT SYSTEM FOR A COMPUTER

CROSS-REFERENCE TO RELATED APPLICATIONS

This is a continuation-in-part of U.S. patent application Ser. No. 09/305,668, filed 5 May 1999, and which is included herein by reference.

BACKGROUND OF THE INVENTION

1. Field of the Invention

The present invention relates to the basic input/output system (BIOS) program of a computer. In particular, the present invention discloses a computer with two BIOS programs that are selectable by a user, and either one of which may be used for backup purposes.

2. Description of the Prior Art

Currently, most computer systems utilize a basic input/output system (BIOS) program that is stored in non-volatile memory, and which is first executed by a central processing unit (CPU) when the computer system is turned on. Besides providing key low-level support for device drivers and operating systems, the BIOS program contains a power on self-test (POST) program, and a bootstrap program. The POST program ensures that the basic components of the computer system are operating correctly. After a successful completion of the POST program, the BIOS program executes the bootstrap program, the purpose of which is to load boot code into memory to boot an operating system. All of this is well known in the art of computer systems.

Recently, computers have begun shipping with the BIOS program stored in flash ROM. The great benefit of this is that the flash ROM may be programmed with a new BIOS program, thus relieving users of the tedious necessity of physically replacing hardware. BIOS program updates become analogous to simple software updates. Unfortunately, and what many users have learned to their chagrin, an improperly performed BIOS update can lead to a totally inoperative computer system, one which will require actual physical servicing of the flash ROM.

A solution to this problem has been proposed by Bealkowski et al. in their U.S. Pat. No. 5,327,531, entitled "Data Processing System Including Corrupt Flash ROM Recovery", filed Sep. 21, 1992, and which is included herein by reference. Bealkowski et al. provides a second non-volatile memory device, an EPROM, that holds a secondary backup BIOS program. In the event that the primary BIOS program in the flash ROM appears corrupted, the secondary BIOS program is shadowed into the CPU address space and executed instead of the primary BIOS program.

Bealkowski et al., however, does not permit a user to explicitly select which BIOS program he or she would prefer to use. It is always assumed that the primary BIOS program in the flash ROM is the preferred program. This, however, is not always the case. Worse still, it is possible for a corrupted primary BIOS program to be shadowed into the CPU address space with the corruption going undetected. This is due to the simple integrity testing that is performed by the hardware as disclosed by Bealkowski et al, which simply checks a byte in the primary BIOS program for 'EAh' (i.e., 0xEA, hexadecimal). In the event that this value is correct when another region of the primary BIOS is corrupted, the user will once again be left with a useless computer system that must be physically serviced to restore operability.

SUMMARY OF THE INVENTION

It is therefore a primary objective of this invention to provide a computer system with at least two BIOS programs, any of which may be selected by a user as the primary BIOS program to be used.

It is another objective of this invention to provide for a more robust integrity-checking feature of the BIOS programs, so that if one of the BIOS programs is found to be corrupted, then the other is automatically shadowed into the CPU address space and used instead. This integrity checking function should work regardless of whether or not a BIOS program already shadowed into memory is, in fact, corrupted.

Briefly summarized, the preferred embodiment of the present invention discloses a selectable basic input/output system (BIOS) for a computer system. The computer system comprises a central processing unit (CPU), and a chipset for supporting the CPU. The chipset has a first general purpose input/output (GPIO) register that is programmable by the CPU. The selectable BIOS includes a primary BIOS program, a secondary BIOS program, a timer circuit for generating a delay signal at a predetermined time after power-on of the computer system, and a BIOS switching circuit. The primary and secondary BIOS programs are both executable by the CPU. The primary BIOS program includes confirmation code for generating a confirmation signal on the first GPIO register. The BIOS switching circuit is used to shadow the primary BIOS program or the secondary BIOS program into a predetermined address space of the CPU according to the confirmation signal and the delay signal. While the primary BIOS program is shadowed into the predetermined address space of the CPU, if the BIOS switching circuit receives the timer delay signal before receiving the BIOS confirmation signal, then the BIOS switching circuit causes the CPU to be reset and shadows the secondary BIOS program into the CPU address space.

It is an advantage of the present invention that by providing the timer circuit and the BIOS confirmation code, it is possible to verify that the primary BIOS program is working correctly. In the event that the primary BIOS program is not functioning properly, the confirmation code from the primary BIOS program will not occur. The delay signal from the timer thus instructs the BIOS switching circuit to use the secondary BIOS program instead, and to reset the CPU accordingly. Further, with modifications, it is possible to provide support for user-selectable BIOS programs.

These and other objectives of the present invention will no doubt become obvious to those of ordinary skill in the art after reading the following detailed description of the preferred embodiment, which is illustrated in the various figures and drawings.

DETAILED DESCRIPTION OF THE PREFERRED EMBODIMENT

Figure 1A:
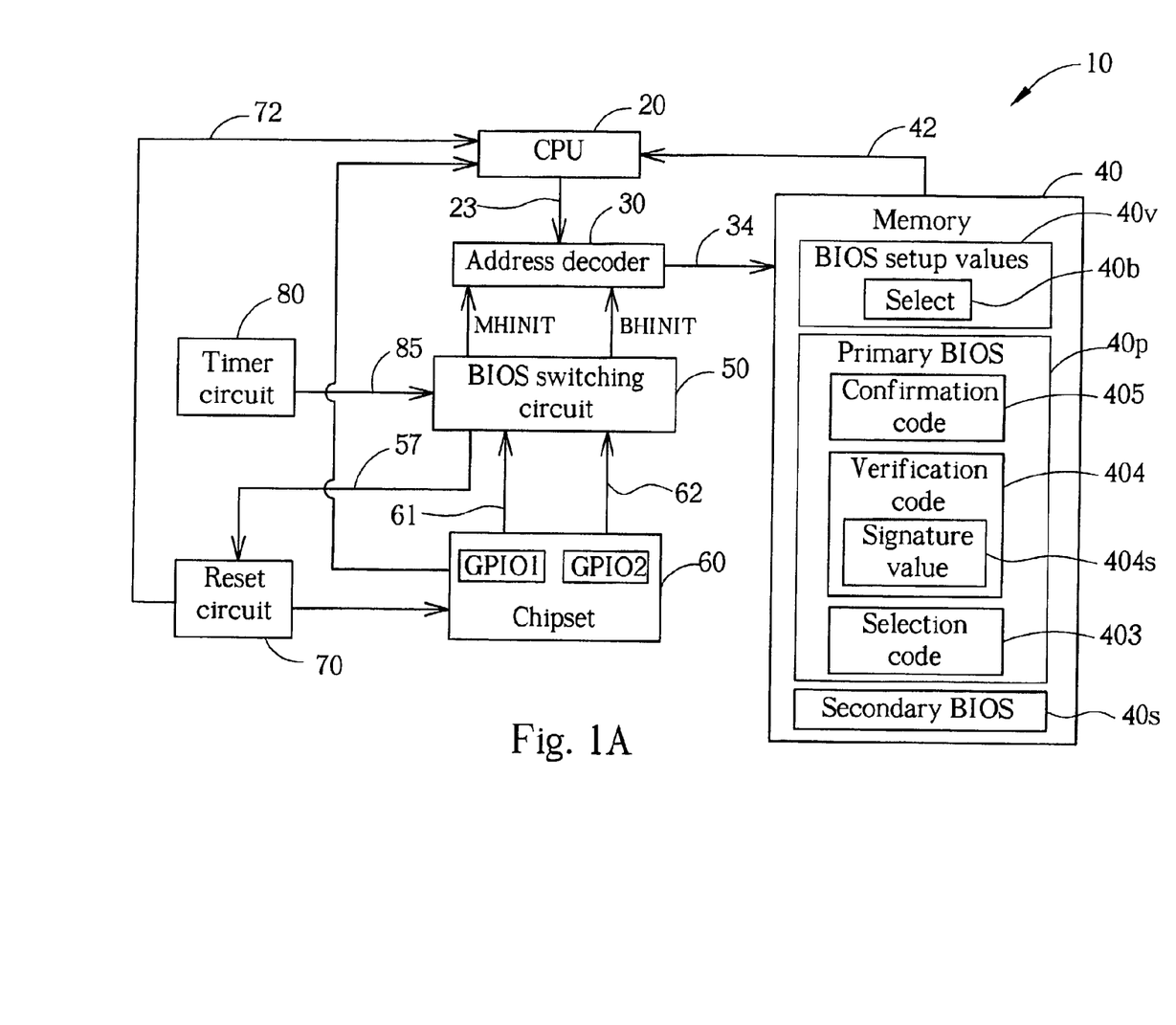
FIG. 1A is a block diagram of a computer system according to the present invention.

Please refer to FIG. 1, which is a simple block diagram of a computer system 10 according to the present invention.

FIG. 1 is not intended to be an exhaustive diagram of all components that may be found in the computer system 10, but rather is merely illustrative of the components required for the present invention. The exact components used for the computer system 10 are a design choice that should be obvious to one skilled in the art in light of the following description.

The computer system 10 includes a central processing unit (CPU) 20 in communications with an address decoder 30, memory 40, chipset 60 and reset circuit 70. CPU address lines 23 send an address to the address decoder 30. In response, the address decoder sets bus address lines 34 to perform an address strobe of the memory 40. Thereafter, the memory 40 provides data along data lines 42 to the CPU 20 according to the bus address lines 34. This arrangement is familiar to those in the art, and enables the address decoder 30 to shadow various regions of the memory 40 into the address space of the CPU 20. In particular, after a reset operation, as from a reset signal 72 received from the reset circuit 70, the CPU 20 will attempt to fetch its first instruction from an initial CPU address location according to the CPU address lines 23. In a 32-bit CPU 20, this initial address is typically 0xFFFFFFF0 hexadecimal, and at this address there usually resides a CPU jump instruction that causes the CPU to begin fetching from a predetermined CPU address location according to the CPU address lines 23. This predetermined CPU address location is determined by the manufacturer of the computer system 10, and the CPU jump instruction resides in a non-volatile region of the memory 40. Typically, the jump instruction is found in the BIOS program, and for the present invention, the jump instruction is found at the end of a primary BIOS program 40p, and at the end of a secondary BIOS program 40s. With knowledge of the predetermined address location, the address decoder 30 can cause the CPU 20 to either result in a data fetch from the primary BIOS program 40p, or from the secondary BIOS program 40s according to MHINIT and BHINIT lines received from a BIOS switching circuit 50. When MHINIT is high and BHINIT is low, the address decoder 30 will cause the primary BIOS program 40p to be shadowed into the predetermined CPU address space. When MHINIT is low and BHINIT is high, the address decoder 30 will cause the secondary BIOS program 40s to be shadowed into the predetermined CPU address space. For example, if the predetermined CPU address as received from the CPU address lines 23 is 0x000F0000 (due to the jump instruction), the address decoder 34 can be set to cause the top of either BIOS program 40p or 40s to be shadowed into 0x000F0000 according to the MHINIT and BHINIT lines. The exact method used to perform this BIOS shadowing functionality is familiar to those in the art.

Figure 1B:
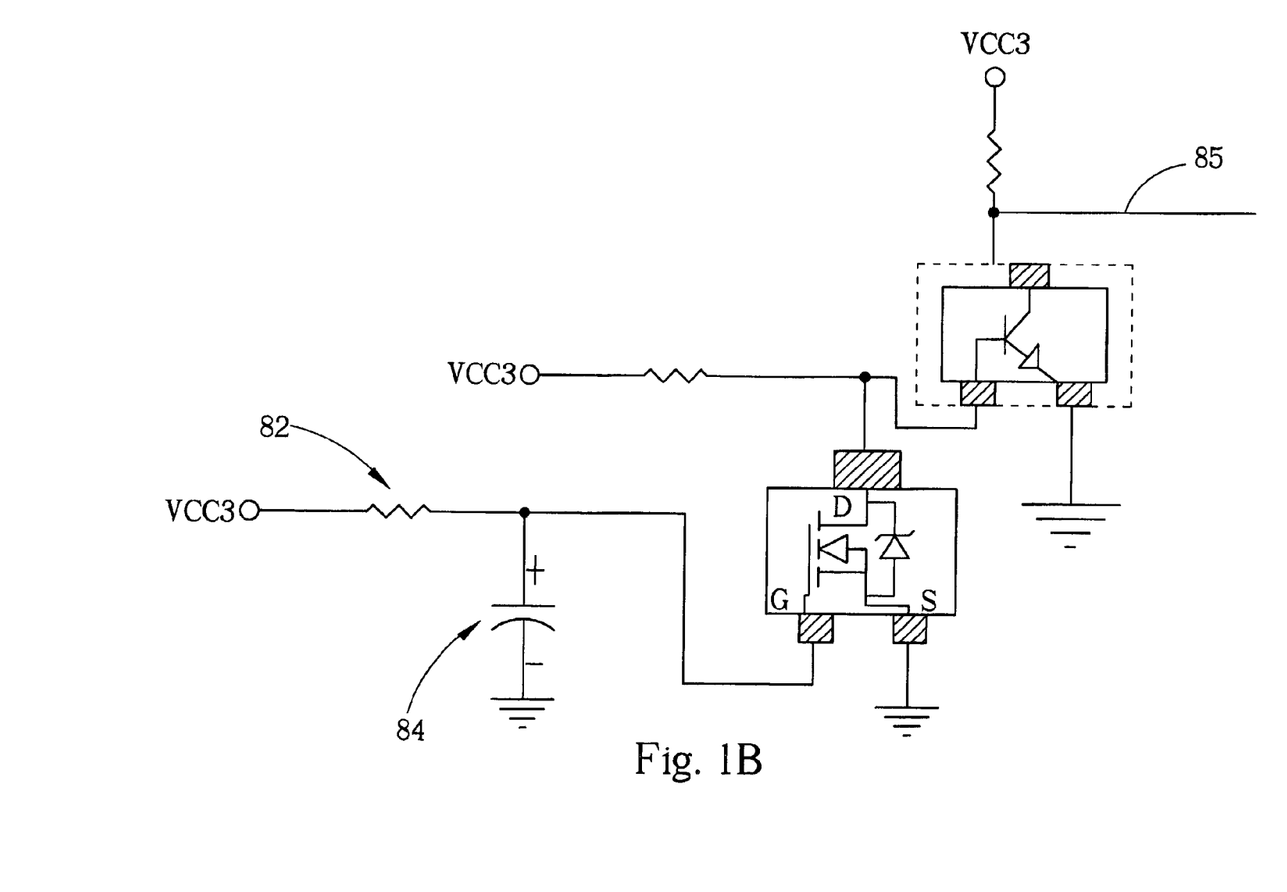
FIG. 1B is an example circuit diagram of a timer according to the present invention.

The chipset 60 is used to provide bus logic support for the CPU 20. Quite frequently, for example, the address decoder 30 is a sub-component of the chipset 60. The chipset 60 includes a number of general purpose input/output (GPIO) registers that can be programmed by the CPU 20 to send values to other hardware components within the computer system 10. In particular, for the preferred embodiment of the present invention, two such GPIO registers are used: a first GPIO register GPIO1 that is used to pass a confirmation signal 61 to the BIOS switching circuit 50, and a second GPIO register GPIO2 that is used to send a selection signal 62 to the BIOS switching circuit 50. A timer circuit 80 is used to send a delay signal 85 to the BIOS switching circuit 50 after a predetermined delay interval since power-on of the computer system 10. This predetermined delay interval is a relatively short amount of time that is nonetheless long enough to ensure that the CPU 20 has a chance to execute confirmation code 405 within the primary BIOS 40p. As such, when setting the delay interval, a designer of the computer system 10 must take into account the processing speed of the CPU 20 and the amount of intervening code that is executed by the CPU 20 between the initial entry point into the primary BIOS 40p and the execution of the confirmation code 405. After power levels have stabilized, a half second or one second delay interval should be sufficient for most computer systems 10. An example circuit diagram of such a timer circuit 80 is presented in FIG. 1B, which is relatively straightforward. After power on, delay signal line 85 will go high after an interval that is determined by resistor 82 and capacitor 84 in a manner known in the art.

Figure 2:
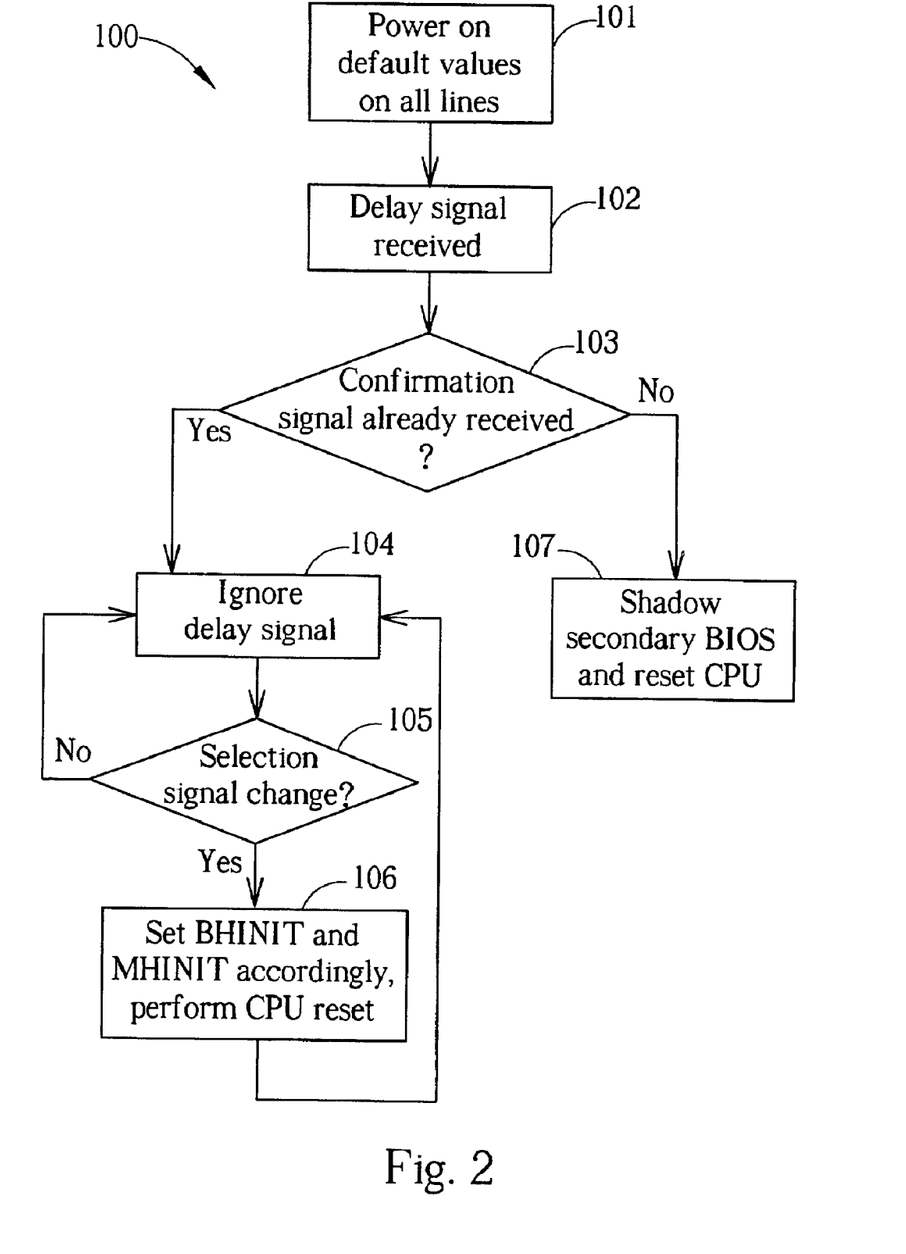
FIG. 2 is a flow chart for a BIOS switching circuit according to the present invention.

The BIOS switching circuit 50 is designed so that after powering on of the computer system 10, the BIOS switching circuit 50 holds the MHINIT signal high and the BHINIT signal low. The primary BIOS program 40p is thus shadowed into the predetermined address space of the CPU 20 for execution by the CPU 20. The timer circuit 80 is designed so that the delay signal 85 is held low for the predetermined delay interval after power on, and then goes high, thus sending a delay signal 85 to the BIOS switching circuit 50. The chipset 60 is designed to keep the confirmation signal 61 low immediately after powering on of the computer system 10 (i.e., the initial state of the confirmation signal 61 is low). When executed, the confirmation code 405 in the primary BIOS program 40p instructs the chipset 60 to set the GPIO1 register so that the confirmation signal 61 goes high, thus sending a confirmation signal 61 to the BIOS switching circuit 50. The BIOS switching circuit 50 is designed so that, after a power on event, if the delay signal 85 is received before the confirmation signal 61, then the BIOS switching circuit sets MHINIT to low, BHINIT to high and sends a reset signal 57 to the reset circuit 70 to reset the CPU 20. Under these conditions, with BHINIT high and MHINIT low, the address decoder 30 shadows the secondary BIOS program 40s into the predetermined address space of the CPU 20, and so after reset line 72 is no longer asserted, the CPU 20 will begin executing the secondary BIOS program 40s. However, if the BIOS switching circuit 50 receives the confirmation signal 61 before receiving the delay signal 85, the BIOS switching circuit 50 is designed to then ignore the delay signal 85. No reset operation of the CPU 20 is performed, then, in this case. A flow chart 100 for the BIOS switching circuit 50 is shown in FIG. 2, the steps for which are detailed in the following:

101: All signal lines have their power-on default values. Hence, the delay signal line 85 is low, GPIO1 is set so that the confirmation signal line 61 is low, and GPIO2 is set so that the selection signal line 62 is set for the primary BIOS program 40p. As such, MHINIT is high and BHINIT is low so that the primary BIOS program 40p is shadowed into the predetermined address space of the CPU 20.

102: After the predetermined delay interval elapses, the timer circuit 80 causes the delay signal line 85 to go high, sending the delay signal 85 to the BIOS switching circuit 50. If functioning properly, the primary BIOS 40p should have had time to execute the confirmation code 405 that would cause the confirmation signal line 61 to go high, thus sending a confirmation signal 61 to the BIOS switching circuit 50. However, if the primary BIOS 40p is corrupted, the confirmation code 405 will not have been executed, the confirmation signal line 61 will remain low, and so no confirmation signal 61 will have been sent to the BIOS switching circuit 50. This will be elaborated on in more detail later, in the context of selectively switching to the secondary BIOS program 40s.

103: If the confirmation signal 61 was received before the delay signal 85, then proceed to step 104. Otherwise, proceed to step 107.

104: The BIOS program 40p or 40s currently shadowed is not corrupted, and so should remain shadowed in the predetermined address space of the CPU 20.

105: Has the selection signal 62 changed? If so, then proceed to step 106. Otherwise, return to step 104.

106: If the selection signal 62 indicates that the primary BIOS program 40p is to be used, then set MHINIT to high and BHINIT to low. Otherwise, set MHINIT to low and BHINIT to high. Use the reset line 57 to instruct the reset circuit 70 to reset the CPU 20. This reset operation should not affect the value of the selection signal line 62. The primary BIOS program 40p or the secondary BIOS program 40s is thus shadowed into the predetermined CPU address space according to the selection signal 62, and will be executed by the CPU 20 after the CPU reset line 72 is no longer asserted. Return to step 104.

107: The confirmation signal 61 was not received by the BIOS switching circuit 50 before the delay signal 85. Assume, then, that the primary BIOS program 40p is corrupted. Ignore the selection signal 62. Set MHINIT low and BHINIT high to shadow the secondary BIOS program 40s into the predetermined CPU address space, and utilize the reset line 57 to instruct the reset circuit 70 to reset the CPU 20. With the secondary BIOS program 40s shadowed, the CPU 20 will begin executing the secondary BIOS program 40s after the reset operation.

Step 106 enables the computer system 10 to switch between the primary BIOS 40p and the secondary BIOS 40s, the selection of which can be controlled by the CPU 20 by way of controlling the GPIO2 register to appropriately set the selection signal line 62. The computer system 10 thus enables a user-selectable BIOS configuration. The unique timer circuit 80 working with the BIOS switching circuit 50 at step 102 ensures that if the primary BIOS program 40p is corrupted, the computer system 10 will automatically switch over to the secondary BIOS program 40s. The computer system 10 makes use of the fact that if the primary BIOS 40p is corrupted and shadowed into the predetermined address space of the CPU 20, the CPU 20 will invariably hang, either due to an illegal instruction exception, an infinite loop or the like. The confirmation code 405, however, will not be executed, and so after the predetermined delay interval, the computer system 10 will switch over to the secondary BIOS program 40s.

The memory 40 includes both volatile and non-volatile memory resources. In particular, though, non-volatile memory resources, such as flash ROM, are used to hold the primary BIOS program 40p, the secondary BIOS program 40s, and BIOS setup values 40v. The BIOS setup values 40v, which are typically used to hold machine-dependent information (such as hard disk parameters, date and time information, bus parameters, etc.), may be shared by both the primary BIOS 40p and the secondary BIOS 40s. Alternatively, however, unique BIOS setup values 40v may be provided for the primary BIOS 40p, and another set of BIOS setup values may be provided for the secondary BIOS 40s, to provide for a complete separation of functionality between the two BIOS programs 40p and 40s, and hence simultaneously enable two distinct machine configurations for the computer system 10. A single flash ROM may be used for this purpose, or multiple flash ROMs may be used. Both the primary BIOS program 40p and the secondary BIOS program 40s contain the complete functionality one would expect of a prior art BIOS program, such as power-on self-test (POST) code, code for low-level device support, bootstrap code, etc. In addition, however, the primary BIOS program 40p has the confirmation code 405, verification code 404, and selection code 403. As noted previously, the confirmation code 405 simply contains instructions for the CPU 20 to program the GPIO1 register so that the confirmation signal 61 is sent to the BIOS switching circuit. In effect, the confirmation code 405 is used by the primary BIOS program 40p to indicate to the BIOS switching circuit 50 that the primary BIOS program 40p considers itself operational and should not be shadowed out of the predetermined CPU address space. The verification code 404 contains instructions for the CPU 20 to verify that the secondary BIOS program 40s is present and uncorrupted. This is done by performing a checksum operation, comparing the checksum of the secondary BIOS program 40s against a signature value 404s. Finally, the selection code 403 contains instructions for the CPU 20 to enable a user to set a select parameter 40b in the BIOS setup values 40v, and instructions to set the GPIO2 register according to the select parameter 40b. The selection code 403 provides for user-selection of shadowing the primary BIOS program 40p or the secondary BIOS program 40s.

Figure 3:
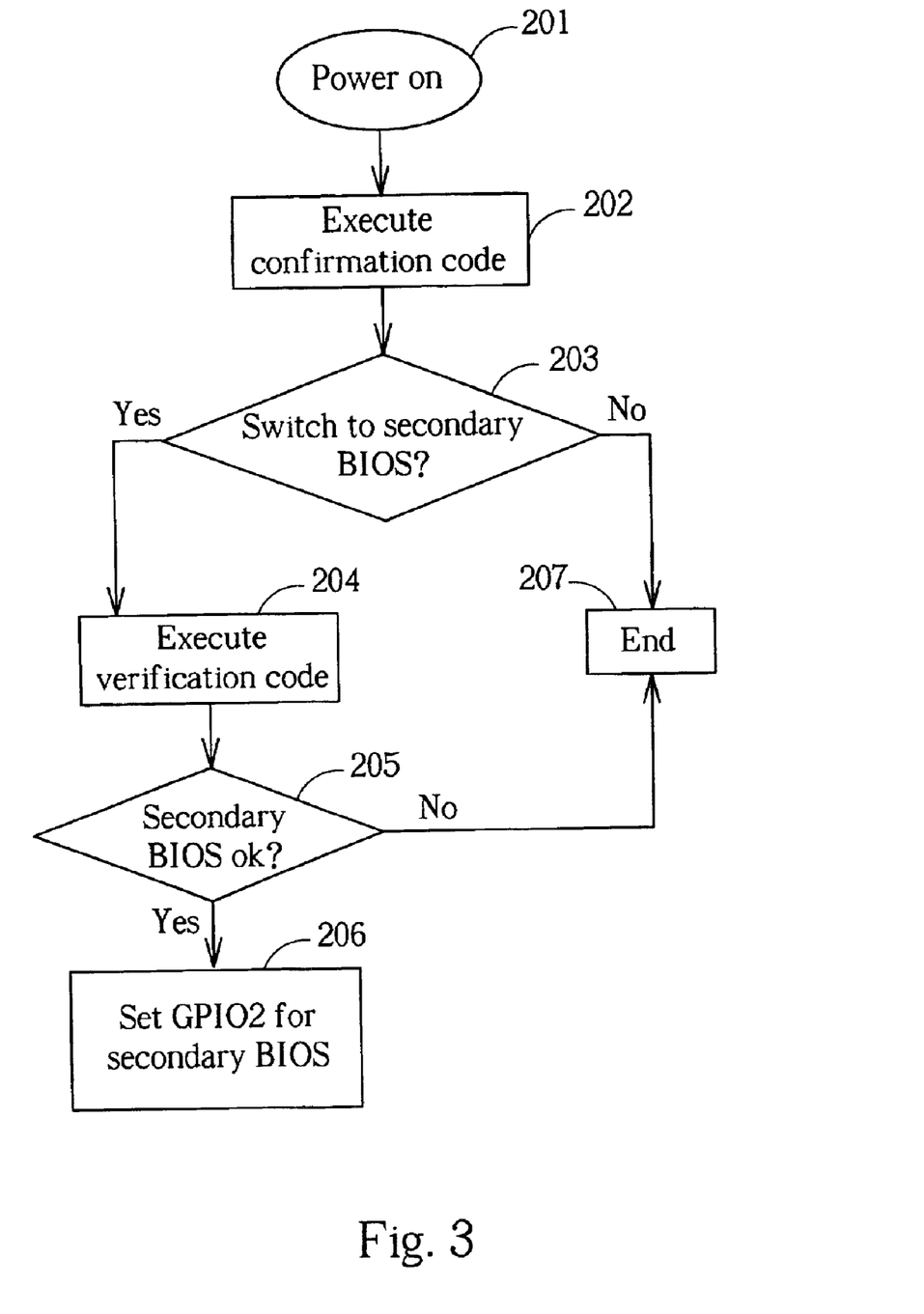
FIG. 3 is a flow chart for first embodiment BIOS selection code according to the present invention.

Please refer to FIG. 3. FIG. 3 is a flowchart for a first embodiment of the selection code 403, the steps of which are detailed in the following:

201: The primary BIOS program 40p has been shadowed into the predetermined address space of the CPU 20, and is being executed by the CPU 20. At this point, the primary BIOS program 40p may perform a few self-test procedures, setup procedures and the like, all of which should require less time than the predetermined delay interval as set by the timer circuit 70.

202: The confirmation code 405 is executed to program the GPIO1 register to send the confirmation signal 61 to the BIOS switching circuit 50, and thus prevent step 107 of FIG. 2 from occurring. In the event that in step 201 the primary BIOS program 40p has detected internal errors, then it may be better not to perform step 202, but rather to sit in a tight loop in step 201 and wait for the BIOS switching circuit 50 to shadow in the secondary BIOS program 40s.

203: Check the select value 40b in the BIOS setup values 40v. If the select value 40b indicates that the secondary BIOS program 40s is to be used, then go to step 204. Otherwise, go to step 207.

204: The secondary BIOS program 40s is to be used. As such, insure that the secondary BIOS program 40s is actually present, and perform a checksum of the secondary BIOS program 40s to insure that the checksum value equals the signature value 404s. Note that the primary BIOS program 40p will have to know where in the CPU address space the secondary BIOS program 40s can be found, which is a design choice of the manufacturer.

205: If the secondary BIOS program 40s is present, and has passed the checksum verification test, then proceed to step 206. Otherwise, the primary BIOS program 40p must continue to be used, and so proceed to step 207.

206: Set the GPIO2 register to a value that will place a value on the selection signal line that indicates usage of the secondary BIOS program 40s. This will cause a value change of the selection signal 62, and will initiate step 105 of the BIOS switching circuit to cause the CPU to be reset, and the secondary BIOS program to be shadowed into the predetermined address space of the CPU. After appropriately setting the GPIO2 register, wait for the reset procedure to occur, as in a tight loop.

207: The primary BIOS program 40p is to be utilized. Continue normal BIOS operations, which will finally terminate with an execution of bootstrap code to load an operating system.

Most BIOS programs have software setup features that can be accessed during the POST procedure to enable a user to configure the BIOS, and hence change values stored in the BIOS setup values 40v. Both the primary BIOS program 40p and the secondary BIOS program 40s have such functionality, which is additionally provided with the ability to let a user set and save the select value 40b.

Figure 4:
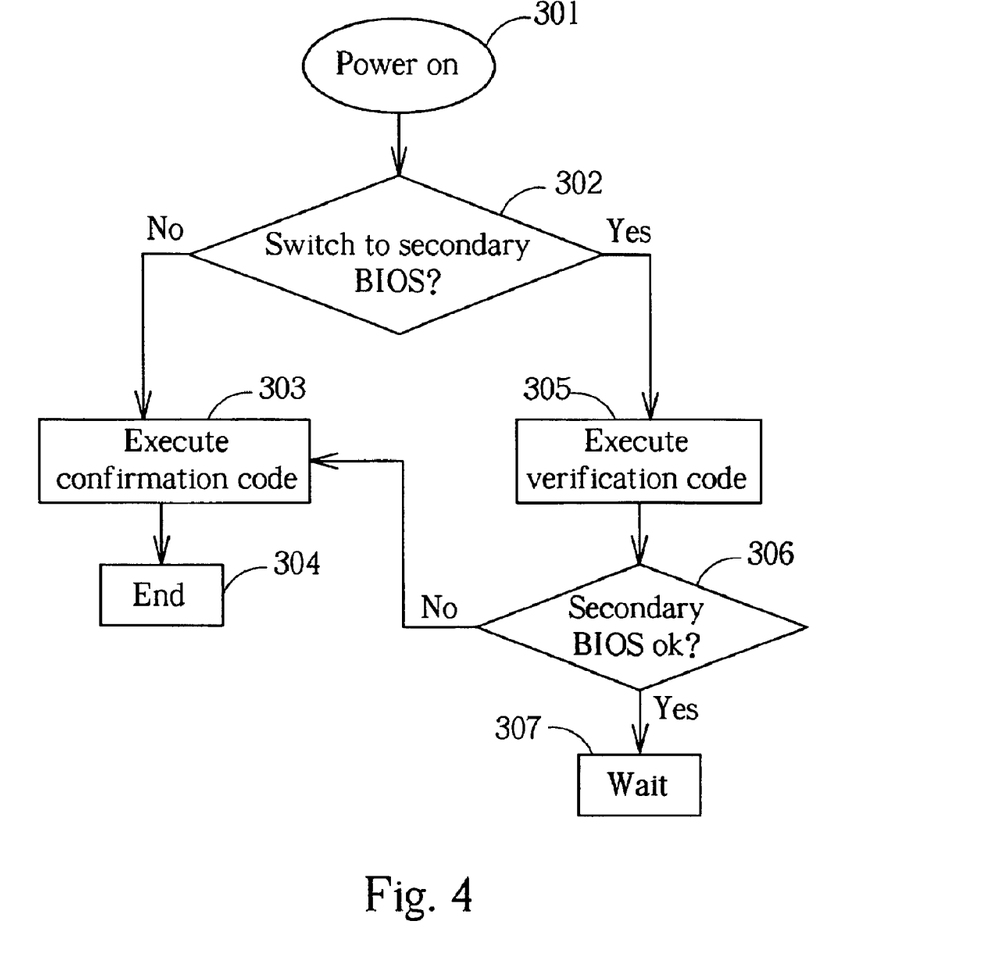
FIG. 4 is a flow chart for second embodiment BIOS selection code according to the present invention.

Another option for switching between the primary BIOS program 40p and the secondary BIOS program 40s is illustrated in FIG. 4, the steps of which are detailed below:

301: The primary BIOS program 40p has been shadowed into the predetermined address space of the CPU 20, and is being executed by the CPU 20. At this point, the primary BIOS program 40p may perform a few self-test procedures, setup procedures and the like, all of which should require less time than the predetermined delay interval as set by the timer circuit 70.

302: Check the select value 40b in the BIOS setup values 40v. If the select value 40b indicates that the secondary BIOS program 40s is to be used, then go to step 305. Otherwise, go to step 303.

303: The primary BIOS program 40p is to be used. The confirmation code 405 is thus executed to program the GPIO1 register to send the confirmation signal 61 to the BIOS switching circuit 50, and thus prevent step 107 of FIG. 2 from occurring.

304: Continue normal BIOS operations, which will finally terminate with an execution of bootstrap code to load an operating system.

305: The secondary BIOS program 40s is to be used. As such, insure that the secondary BIOS program 40s is actually present, and perform a checksum of the secondary BIOS program 40s to insure that the checksum value equals the signature value 404s.

306: If the secondary BIOS program 40s is present, and has passed the checksum verification test as performed by the verification code 404, then proceed to step 307. Otherwise, the primary BIOS program 40p must continue to be used, and so proceed to step 303.

307: Sit in a tight loop waiting for the delay signal 85 from the timer circuit 80. Do not execute the confirmation code 405. This will cause the BIOS switching circuit 50 to perform step 107, and thus the secondary BIOS program 40s will be utilized.

Many minor variations are possible with the present invention. For example, under certain hardware configurations it is possible for the selection code 403 to directly program the reset circuit 70 to perform a reset operation of the CPU 20. In this case, the BIOS switching circuit 50 would not generate the reset signal 57 when the selection signal 62 changes, but instead would simply wait for the selection code 403 to perform the necessary reset operation. With just a little obvious modification of the preferred embodiment, it is possible to design a computer system 10 that is capable of supporting several BIOS programs, and permitting a user to select between them. Under such a design, it may also be desirable to enable the BIOS switching circuit 50 to reset the circuit timer 80 so that a delay signal 85 is received after every reset operation, rather than just after a power-on event. In this manner, with each BIOS program provided its own confirmation code segment, it is possible for the BIOS switching circuit 50 to cycle through the BIOS programs until one of them successfully confirms with the BIOS switching circuit 50.

Additionally, it is possible to provide for a recovery operation of a BIOS that is found to be defective. For example, if the verification code 404 of the primary BIOS 40p finds that the secondary BIOS 40s is corrupted, the verification code 404 may then cause the secondary BIOS 40s to be overwritten by a copy of the functional primary BIOS 40p. In effect, two copies of the primary BIOS 40p would then be present. However, if, as previously indicated, the secondary BIOS 40s is provided its own set of BIOS setup values 40v, then such a configuration would still permit a user to provide for two unique machine setup states despite the fact that the program code of the primary BIOS 40p and the secondary BIOS 40s is effectively identical. Note that such an overwriting operation of the secondary BIOS 40s by the primary BIOS 40p is not necessarily a straightforward copying job, as it maybe necessary to resolve relocation considerations with regards to pointers, CPU 20 jump instructions, and access of the BIOS setup values 40v. However, such procedures are known in the art and do not need to be elaborated on here in any detail. As a simple example, a pure copying operation could be performed to place an identical copy of the primary BIOS 40p into the memory allocated for the secondary BIOS 40s. Then, using a patch table or algorithm, predetermined areas of the secondary BIOS 40s are changed. In effect, a functionally identical copy of the primary BIOS 40p will be provided as the secondary BIOS 40s. In a similar manner, the secondary BIOS 40s can be provided verification code analogous to that of the primary BIOS 40p. Such verification code would ensure that the primary BIOS 40p is not corrupted, and attempt to correct such corruption if detected.

In contrast to the prior art, the present invention provides a timer circuit that works in conjunction with a BIOS switching circuit to selectively shadow one of a possible multiple of BIOS programs. In the event that a shadowed BIOS program is not functioning properly and so does not send a confirmation signal to the BIOS switching circuit, after a delay signal is received from the timer the BIOS switching circuit will shadow in another BIOS program in place of the corrupted BIOS program. By saving a selection value in non-volatile memory, it is possible to provide for user-selectable BIOS programs, while ensuring that at least one BIOS program will successfully load to boot the computer. Additionally, verification code provided in at least one of the BIOS programs is better able to verify that another BIOS program may be corrupt, and thus avoid the inadvertent usage of such a corrupted BIOS.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A selectable basic input/output system (BIOS) for a computer system, the computer system comprising:
   a central processing unit (CPU); and
   a chipset for supporting the CPU, the chipset having a first general purpose input/output (GPIO) register programmable by the CPU;

the selectable BIOS comprising:

a primary BIOS program executable by the CPU and comprising confirmation code for generating a confirmation signal on the first GPIO register;

a secondary BIOS program executable by the CPU;

a timer circuit for generating a delay signal at a predetermined time after power-on of the computer system; and a BIOS switching circuit for causing shadowing of the primary BIOS program or the secondary BIOS program into a predetermined address space of the CPU according to the confirmation signal and the delay signal;

wherein while the primary BIOS program is shadowed into the predetermined address space of the CPU, if the BIOS switching circuit receives the delay signal before receiving the confirmation signal, then the BIOS switching circuit causes the CPU to undergo a first reset operation and shadows the secondary BIOS program into the predetermined address space for execution by the CPU after the first reset operation, and if the BIOS switching circuit receives the delay signal after receiving the confirmation signal, then the BIOS switching circuit does not cause the CPU to undergo the first reset operation.

2. The selectable BIOS of claim 1 wherein the delay signal is timed to be sufficiently after the power-on of the computer system to permit the CPU to execute the confirmation code.

3. The selectable BIOS of claim 2 wherein the primary BIOS program further comprises verification code executable by the CPU for verifying data integrity of the secondary BIOS program.

4. The selectable BIOS of claim 3 wherein the primary BIOS program further comprises selection code for performing the following steps:

calling the verification code to determine if the secondary BIOS program is present and uncorrupted;

if the secondary BIOS program is present and uncorrupted, then effectively halting the CPU before execution of the confirmation code to await the delay signal from the timer circuit; and if the secondary BIOS program is not present or is corrupted, then causing the confirmation code to be executed.

5. The selectable BIOS of claim 3 wherein the primary BIOS program further comprises selection code for performing the following steps:

calling the confirmation code;

calling the verification code to determine if the secondary BIOS program is present and uncorrupted; and if the secondary BIOS program is present and uncorrupted, then causing the CPU to undergo a second reset operation and causing the BIOS switching circuit to shadow the secondary BIOS program into the predetermined address space for execution by the CPU after the second reset operation.

6. The selectable BIOS of claim 5 wherein the chipset further comprises a second GPIO register for providing a selection signal to the BIOS switching circuit, the BIOS switching circuit causing shadowing of the primary BIOS program or the secondary BIOS program into the predetermined address space of the CPU according to the selection signal after the second reset operation, and the selection code further comprises the following step:

if the secondary BIOS program is present and uncorrupted, then causing the second GPIO register to generate the selection signal to select the second BIOS program.

7. The selectable BIOS of claim 6 further comprising a non-volatile memory for holding a user-adjustable selection value accessible by the CPU, and the selection code programs the second GPIO register according to the selection value.

8. The selectable BIOS of claim 3 wherein the verification code further provides functionality for causing the secondary BIOS program to be overwritten by a functionally identical copy of the primary BIOS program if the secondary BIOS program is found to be corrupted.

* * * * *